United States Patent [19]
Gardiner

[11] 3,914,629
[45] Oct. 21, 1975

[54] CENTERLESS BRUSHLESS DC MOTOR

[76] Inventor: William P. Gardiner, 3621 Highland, White Bear Lake, Minn. 55110

[22] Filed: Dec. 13, 1974

[21] Appl. No.: 532,617

[52] U.S. Cl. .................... 310/46; 310/87; 310/82; 310/156; 310/219; 115/18 E
[51] Int. Cl.² ........................................ H02K 37/00
[58] Field of Search......... 115/18 E; 310/46, 87, 82, 310/156, 219, 232

[56] References Cited
UNITED STATES PATENTS

| | | | |
|---|---|---|---|
| 2,413,805 | 1/1947 | Vickers | 310/82 |
| 2,517,462 | 8/1950 | Christian | 310/46 |
| 2,714,866 | 8/1955 | Pleuger et al. | 310/87 X |
| 2,824,984 | 2/1958 | Harris | 310/87 |
| 3,539,845 | 11/1970 | Stcherbatcheff | 310/156 X |
| 3,549,925 | 12/1970 | Johnson | 310/156 X |
| 3,586,942 | 6/1971 | McMahan | 310/156 X |
| 3,708,251 | 1/1973 | Pierro | 115/18 E X |
| 3,711,755 | 1/1973 | Meyer, Jr. | 115/18 |
| 3,735,170 | 5/1973 | Christensen et al. | 310/82 X |
| 3,796,899 | 3/1974 | Giachello | 310/156 |
| 3,819,964 | 6/1974 | Noodleman | 310/46 |

Primary Examiner—Donovan F. Duggan

[57] ABSTRACT

A centerless brushless DC motor having a cylindrical housing containing thrust bearings mounting a rigid cylindrical drive tube for rotation about a central axis, wherein the internal surface of the drive tube defines a cylindrical passageway extending through the motor housing. A plurality of permanent magnets forming an annular ring are secured to the outer surface of the drive tube for rotation therewith. A cylindrical stator core fixedly secured within the housing around the drive tube is wound for presenting a plurality of induced magnetic poles at raised field pole pieces cooperatively aligned with and in close proximity to the rotating permanent magnets. An annular slip-ring assembly having a plurality of slip-ring elements eccentrically movable around the central axis provides selective sequential energization of the stator windings from a DC source responsive to rotation of the drive tube, creating an induction-repulsion state between the induced and permanent magnetic fields which exerts a continuous rotational torque upon the drive tube. A centerless helical propulsion member may be secured to the drive tube, providing a weedless boat propulsion motor having significantly increased thrust ratings.

18 Claims, 11 Drawing Figures

CENTERLESS BRUSHLESS DC MOTOR

BACKGROUND OF THE INVENTION

1. Field of the Invention

This invention relates generally to gearless drive apparatus and more particularly to a centerless, brushless DC motor suitable for immersable use within a liquid media.

2. Description of the Prior Art

Gearless drive apparatus in the form of electric motors having drive shafts directly connected for performing the required drive functions have long been known in the art. Such motors have appeared in both synchronous and DC construction and in a multitude of sizes and configurations, depending upon the use to which they are to be put.

Where AC power is readily available it may oftentimes be more advantageous for one to use a synchronous motor; however, there are many situations where the only available power source is a DC battery which requires the use of a DC motor. it is well known that the DC motor offers significant advantages of simplified control over synchronous motors and displays broad use flexibility over a wide variety of performance characteristics. For example, the only control required for regulating the speed of a DC motor is a potentiometer for varying the voltage applied to the DC motor.

For the above reasons, and further for its relatively lightweight, quiet running operation, and the fact that it is fully operable when completely immersed within a liquid media, the DC motor is ideally suited for use as a boat propulsion means where the only available source of energy is a DC battery pack. A DC boat motor is also desirable for use in applications wherein sonar detection of operating noise is to be minimized or wherein pollution control requirements prohibit the use of standard gasoline driven outboard motors. The conventional DC motor, characterized by a rotor having a plurality of armature windings energized by means of brushes and supported by a solid central drive shaft has, however, severely limited the use of DC motors within those applications above described. For example, when used as a standard boat motor, the DC motors of the prior art have typically been suspended below the bottom surface of the boat, with the drive shaft of the motor directly connected to turn a propeller, and have required alignment relative the direction of propulsion such that the body proper of the DC motor is directly aligned with and precedes the propeller as the motor is propelled through the water. The physical limitations of such a configuration can be readily appreciated. To increase the propulsion power of the DC motor of conventional design, for a fixed power input, a proportionate increase in the number and size of the armature and stator windings is required, thus increasing the physical size of the body proper of the DC motor. The increased size, necessitates increasing the diameter of the DC motor which results in excessive cavitation behind the body proper of the motor as it procedes through the water. The cavitation thus produced extends through the propeller operating region, decreasing its thrust. If the increased size of the DC motor is to be effected by extending the longitudinal length of the motor in the direction of the motor shaft, the physical length of the motor becomes unduly prohibitive and inconvenient to use. Also, any increase in propulsion speed, increases the cavitation effects of the motor designed in the elongated configuration, further decreasing the motor's thrust. The compromise displayed by DC boat motors of the prior art has been to minimize cavitation problems while maintaining a relatively workable motor size. This tradeoff has traditionally resulted in the restricted use of such DC motors to relatively low horsepower applications such as for trolling and the like.

The conventionally configured DC motor also employs brushes for energizing rotating armature windings of the rotor, requiring maintenance and replacement thereof on a regular basis, and making such motors generally impractical for extended operational uses where maintenance is not readily available. A further limiting characteristic of boat motors in general has been their characteristic use of the standard marine propeller having a plurality of pitched blades rotatably mounted about a central shaft. The marine propeller, besides being highly susceptible to entwinement by weeds and the like by reason of its rotational motion about a central shaft, also does not maximize propelling thrust through the engaged fluid since there is a certain amount of cavitation normally induced behind the propeller blades (i.e. the characteristic bubbles viewed in the wake of an operating propeller) which proportionately reduces the forward thrust of the propeller blades by reducing the effective surface area of the propeller blades exposed to the engaged fluid thus reducing effective fluid displaced thereby. Further, since the propeller configuration conventionally employed with such prior art boat motors has blades shaped primarily for maximizing thrust in one direction only, to reverse the direction of thrust of the motor requires physical movement of the motor housing 180° about its supporting shaft, or a severe reduction in reverse thrust power if the rotational direction of the motor's rotor is reversed.

Recognizing the above-cited disadvantages of electric motors in general when employed as boat propulsion devices, one prior art synchronous motor for large boats having available supplies of polyphase alternating current for energization thereof, has employed a generally cyindrical configuration using stationary field and stator coils operatively passing excitation flux paths through a rotating pair of interdigitated space salient magnetic pole pieces for exerting a rotational torque upon the rotor. This prior art propulsion apparatus, while offering significant advantages over traditional motor configurations, still requires the use of relatively complex and precisely aligned rotor pieces and the availability of polyphase alternating current for energization. This apparatus also employs the conventional marine propeller as the actual propulsion means connected for rotation with the rotor, which suffers all of the weed entanglement loss of the thrust disadvantages previously discussed.

The present invention overcomes these prior art disadvantages by providing a simple, efficient, relatively maintenance free and weedless DC motor having increased power ratings for any given size and offering the flexibility of increasing horsepower without an accompanying decrease in performance or flexibility of use. The DC motor of this invention is particularly applicable for use as a boat propulsion motor or as a fluid propulsion motor within an enclosed pipeline or the like and is generally applicable for use in any situation wherein a centerless DC motor drive capability is desired or required. While particular materials will be described in connection with the elements of the preferred embodiment of the invention, it will be understood that the invention is not limited to the use of these materials. Further while the preferred embodiment will be described as a four-pole motor, it will be understood that the invention applies equally well to motors having any number of poles. Also, while specific sizes and shapes of elements of the invention will be disclosed in connection with its preferred embodiment, it will be understood that the invention applies equally well to enlarged or reduced versions thereof. Further, while the invention will be particularly described in connection with its use as a propulsion device for a boat, it will be understood that other DC motor applications are equally included within the spirit and intent of this invention.

SUMMARY OF THE INVENTION

The present invention provides an improved centerless DC motor. The motor is characterized by a generally cylindrical housing defining a cylindrical passageway about a central axis extending therethrough. A cylindrical rotor is rotatably mounted by bearings at its respective ends for rotation within the housing about the central axis, with its inner surface being coterminous with the passageway through the housing. A plurality of permanent magnets are circumferencially mounted to the outer surface of the rotor for rotation therewith within the housing. A generally cylindrical stator core member having a slotted inner surface defining a plurality of raised field pole portions is fixedly mounted within the housing and coaxially aligned with the central axis such that the plurality of field pole portions are confrontingly aligned in spaced relationship with the rotating permanent magnets. A continuous length of conductor, wound in a predetermined sequential wiring pattern within the slots of the stator core member causes, when energized, magnetically induced poles of predetermined polarities to be generated at the raised field pole portions which confront the magnetic fields of the rotatable permanent magnets.

An annular slip-ring assembly comprising a plurality of continuous slip ring elements, a pair of electrodes and a plurality of slip-ring positioning members is secured within the housing adjacent the cylindrical rotor. The plurality of slip-ring elements are interposed between the cylindrical rotor and a plurality of electrical contact tabs operatively connected at spaced intervals along the conductor winding and are independently eccentrically movable about the central axis for selectively applying power from the pair of electrodes to predetermined portions of the conductor winding. A plurality of positioning elements mounted for rotation with the rotor are aligned with respective ones of the slip-ring elements for slidably engaging and displacing the slip-rings about the central axis in predetermined sequential relationship relative one another. Current flowing through the slip-rings, energizes the conductor winding at selected positions therealong, inducing a plurality of magnetic poles within the stator field pole pieces. The induced magnetic poles react with the magnetic fields of the permanent magnets to create an induction-repulsion effect producing a rotational torque upon the rotor. The induced magnetic fields enabled by the slip-ring assembly, operatively rotates with the cylindrical rotor, maintaining a constant rotational torque upon the rotor element.

BRIEF DESCRIPTION OF THE DRAWING

Referring to the Drawing wherein like numerals represent like parts throughout the several views:

FIG. 9b is a diagrammatic view in top elevation of the positioning elements of the preferred embodment disclosed in FIG. 9a.

DESCRIPTION OF THE PREFERRED EMBODIMENT

Figures 1, 3, 4, 5, 6:
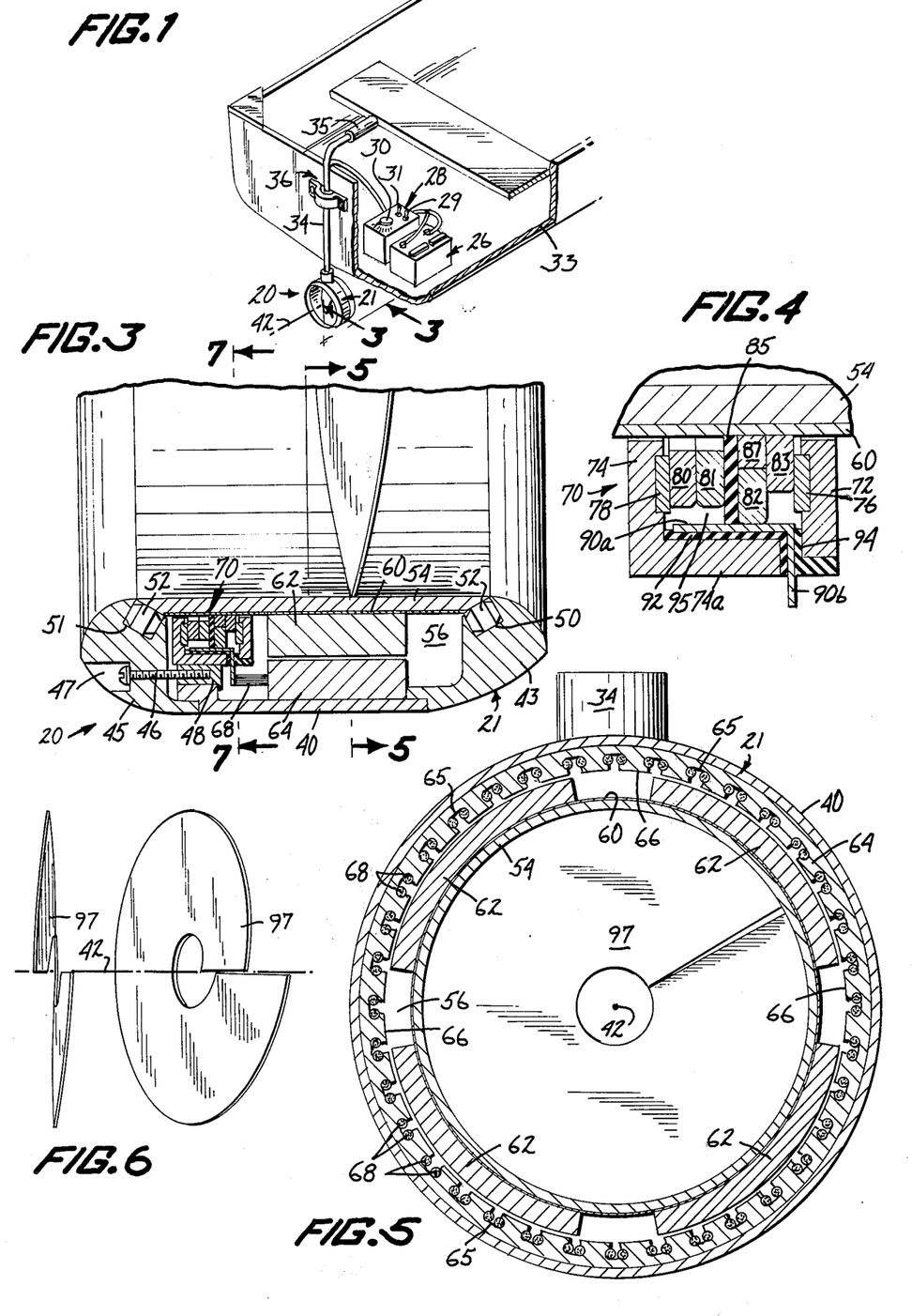
FIG. 1 is a perspective view of a preferred embodiment of the DC motor of the present invention, illustrated in its application as a propulsion device for a boat.
FIG. 3 is a quarter sectional view of the DC motor portion of the preferred embodiment disclosed in FIG. 1, generally taken along the line 3—3.
FIG. 4 is an enlarged sectional view of the slip-ring portion of the preferred embodiment disclosed in FIG. 3.
FIG. 5 is a front sectional view of the DC motor of the preferred embodiment taken generally along the line 5—5 in FIG. 3.
FIG. 6 illustrates two views of the helical propulsion element of the preferred embodiment disclosed in FIGS. 1 and 5, as viewed in direct and partially skewed side elevational views.

Referring to the Figures, a preferred embodiment of the DC motor of this invention is physically illustrated as it would appear as a boat propulsion apparatus at 20 in FIG. 1. The DC motor 20, schematically illustrated in FIG. 2, generally has a rotor member 22 and a stator field member 24 having first and second output terminals 24a and 24 b respectively. The DC motor 20 illustrated as typically connected to a DC supply 26 by means of a control network 28. The output terminals of the DC supply 26 are directly connected to a first pair of stationary contacts 29a of a reversing switch 29. The reversing switch 29 further has a second pair of stationary contacts 29b and a pair of movable contacts 29c for reversably connecting the first and second pairs of stationary contacts. The first terminal 24a of the stator field windings 24 is connected to one of the stationary contacts 29b of the reversing switch 29 by means of a potentiometer 30 and an on/off switch 31. The second terminal 24b of the stator field windings 24 is directly connected to the remaining contact 29b of the second pair of stationary contacts 29b of the reversing switch 29.

The DC motor 20 is illustrated in FIG. 1 as it would typically appear when mounted to propel a boat 33. The DC motor 20 has a generally cylindrical external housing 21 secured to an elogated shaft 34 which is bent to form a control arm thereof, terminating at a handle 35. The shaft 34 is pivotally mounted to the hull of the boat 33 at 36 for enabling rotatable movement of the housing 21 of the motor 20 about the longitudinal axis of the shaft 34, such that the housing 21 clears the lower surface of the boat hull.

In the preferred embodiment, the shaft 34 is of hollow tubular construction and accommodates a pair of conductor wires leading from the control unit 28 to the energizing terminals of the stator windings 24a and 24b, (FIG. 2), hereinafter described in more detail.

The housing 21 of the DC motor 20 has a continuous cylindrical outer shell 40 (FIG. 3) generally symmetrically disposed about a central axis 42 and defining the outer circumference of the housing 21. A first annular bezel ring 43 is securely attached by means of a plurality of pins (not illustrated) to one edge of the outer shell 40, and defines a first end of the DC motor 20. A second annular bezel ring 45 is sized to cooperatively mate with the second edge of the cylindrical outer shell 40.

The second bezel ring 45 defines a second end of the motor 20 and is secured to the cylindrical outer shell 40 by means of a plurality of bolts 46 held within a plurality of slots 47 symmetrically disposed about the central axis 42 at regular intervals around the circumference of the second bezel ring 45. The outer shell 40 has a plurality of raised mounting block elements 48 positioned around the circumference of the second edge of the outer shell 40 so as to identically align with the plurality of slots 47 within the second bezel ring 45. Each of the mounting block elements 48 is threaded to accept one of the bolts 46 for adjustably securing the second bezel ring 45 to the outer shell 40. In the preferred embodiment, the cylindrical outer shell 40 is made of steel and the first and second bezel rings 43 and 45 respectively are constructed of aluminum, however, other materials could equally well be employed within the spirit and intent of this invention.

The first and second bezel rings 43 and 45 respectively each defines an annular bearing race 50 and 51 respectively, opening toward and symmetrically disposed about and forming an angle with the central axis 42. Each of the annular races 50 and 51 contains a plurality of roller bearings 52, sized to freely advance around the circumference of their respective bearing races and supportingly engaging a cylindrical drive tube 54, uniformly along its outer edges. The outer edges of the cylindrical drive tube 54 are bevelled at angles relative the central axis 42 which exactly corresponds to those angles which the bearing races 50 and 51 define with the central axis 42. The drive tube 54 is constructed of steel in the preferred embodiment, however, other rigid materials could equally well be employed within the spirit and intent of this invention. The longitudinal length of the drive tube 54 is sized to simultaneously cooperatively engage the roller bearings 52 within the races 50 and 51, when the bezel rings 43 and 45 respectively matingly engage the cylindrical outer shell 40 as illustrated in FIG. 3. The cylindrical drive tube 54 is mounted upon the roller thrust bearings 52 is free to rotate about the central axis 42, and is symmetrically disposed thereabout defining a clylindrical passageway about the longitudinal axis 42 extending enntirely through the DC motor 20. The adjustments bolts 46 enable longitudinal adjustment along the central axis 42 of the second bezel ring 45 relative the first bezel ring 43, thus enabling variable bearing pressure to be applied to the drive tube 54 by means of the roller bearings 52. Although a specific bearing and mounting apparatus for the drive tube 54 has been illustrated, it will be understood that other techniques could equally well be employed within the spirit and intent of this invention.

The outer surface of the drive tube 54, in cooperation with the first and second bezel rings 43 and 45 respectively and the cylindrical outer shell 40 cooperatively define a generally cylindrical internal cavity 56. The outwardly directed surface of the guide tube 54 is covered with a thin layer of insulator material 60, which is epoxy in the preferred embodiment. The insulating layer 60 electrically isolates the drive tube 54 from the electrical components, to be hereinafter described in more detail, within the internal cavity 56.

Referring to FIGS. 3 and 5, a plurality of arcuately shaped permanent magnets 62 are secured to the outer surface of the cylindrical drive tube 54 at regularly spaced intervals therealong, for rotation therewith within the internal cavity 56. In the preferred embodiment, the entire arcuately shaped lateral surface of each magnet represents only one magnetic pole, for example either a North or a South pole. The permanent magnets 62 are arranged upon the outer surface of the drive tube 54 such that their magnetic surface polarities alternate between North and South poles, as illustrated in FIG. 5. Four permanent magnets 62 are used in the preferred embodiment, corresponding to a four-pole DC motor; however, it will be understood that the DC motor of this invention could be designed for any number of poles, and that the number of permanent magnets required would vary appropriately therewith.

Referring to FIGS. 3 and 5, an annular stator core member 64 is fixedly secured to the cylindrical outer shell 40 of the housing 21 within the cavity 56. The stator core member 64 has a plurality of winding grooves 65 and field pole pieces 66 alternately disposed about the inner circumference of the annular stator core member 64 such that the plurality of field pole pieces 66 are aligned with and in close proximity to the rotatable permanent magnets 62. A continuous length of wire, generally designated at 68, is interwound amoung the plurality of winding grooves 65 in the stator core member 64, in a manner hereinafter described, to define the DC field schematically illustrated at 24 in FIG. 2.

Referring collectively to FIGS. 3, 4, 7, 8 and 9, a generally annular slip-ring assembly 70 is mounted within the cylindrical cavity 56. The slip-ring assembly 70 includes first and second annular electrode support members 72 and 74 respectively, fixedly mounted within the housing 21 and positioned for close confronting relationship with but spaced apart from the outer surface of the drive tube 54. The first and second electrode support members 72 and 74 respectively are in the preferred embodiment, formed of aluminum and are electrically connected (not illustrated) to the positive and negative output terminals of the DC supply 26. The second electrode support member 74 has an extended support arm portion 74a extending at a right angle to the main portion of the second electrode 74 and of ring-shaped configuration for continuously extending within the internal cavity 56 about the central axis 42.

The first electrode support member 72 has an annular carbon ring 76 secured to its inner surface (FIG. 4), and the second electrode support 74 likewise has an annular carbon ring 78 secured to its inner surface. The carbon rings 76 and 78 provide electrical output contacts for the first and second electrode support members 72 and 74 respectively, as described in more detail later herein.

First and second annular slip-ring members 80 and 81 respectively are positioned adjacent the first electrode support 72 in cooperative sliding engagement such that a first side surface of the first slip-ring element 80 slidingly engages the annular carbon ring 76 and such that the opposite side surface of the first slip-ring element 80 slidably engages one side of the second slip-ring element 81 (FIG. 4).

Third and fourth annular slip-ring elements 82 and 83 respectively are positioned adjacent the second electrode support member 74. A first side surface of the third slip-ring element 82 slidably engages the annular carbon ring 78, and the opposite side surface of the third slip-ring element 82 slidably engages one side surface of the fourth slip-ring element 83. An annular insulator ring member 85 is disposed between and slidably engages one side surface each of the second and fourth slip-ring elements 81 and 83 respectively, and is sized to slidably engage the epoxy coating 60 of the drive tube 54 as it rotates about the central axis 42.

The slip-ring assembly 70 is configured such that a continuous compression seal is provided between the annular carbon rings 76 and 78 by means of the intermediate first and second slip-ring elements 80 and 81, the insulator ring 85 and the fourth and third slip-ring elements 83 and 82 respectively. The slip-ring elements 80, 81, 82, and 83 of the preferred embodiment are electrically conductive brass elements, but could equally well be made of other conductive materials.

Figures 2, 7, 9A:
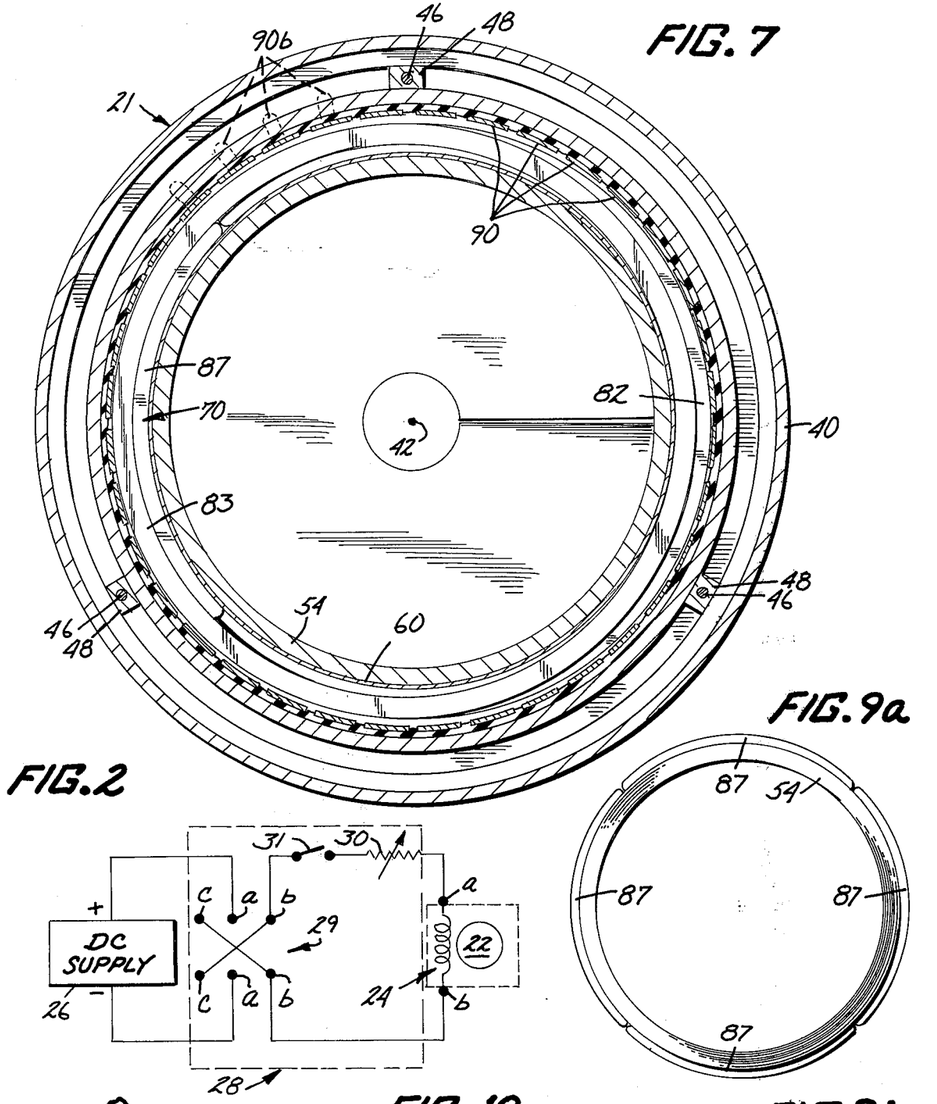
FIG. 2 is a schematic diagram of a typical electrical system employing the DC motor of the preferred embodiment.
FIG. 7 is a front elevational view of the DC motor of the preferred embodiment disclosed in FIG. 3 generally taken along the line 7—7 with portions thereof broken away, illustrating the operational displaced alignment of the slip-ring elements.
FIG. 9a is a front elevational view in reduced size thereof removed, illustrating the relative alignment of the positioning elements on the rotor of the preferred embodiment.
Figure 9B:
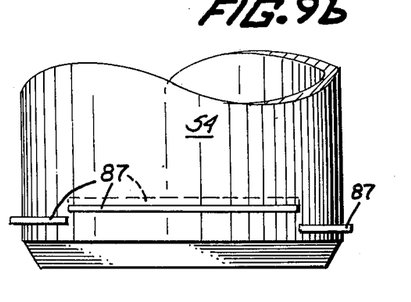

Referring to FIG. 9, a plurality of rubbing block elements 87 are secured to the outer periphery of the drive tube 54 at longitudinally and circumferencially spaced positions therealong. One each of the rubbing block elements 87 is positioned along the drive tube 54 so as to identically align with one each of the slip-ring elements 80 through 83. The sectional view of FIG. 4 illustrates one of the rubbing block elements 87 as slidably engaging the second slip-ring element 81. The sectional view of FIG. 7 illustrates the sliding engagement action of a rubbing block element 87, causing its engaged slip-ring element, in this case the fourth slip-ring element 83, to eccentrically move about the central axis 42. The sliding block elements 87 are securely attached to the drive tube 54 for rotation therewith, and are made of teflon in the preferred embodiment.

A plurality of generally "L"shaped conductive tab members 90 are circumferencially disposed at regular intervals about the inner circumference of the extended support arm portion 74a of the second electrode support 74 of the slip-ring assembly 70 (FIG. 7), one each of the conductive tab members 90 being present for each of the winding grooves 65 and being operatively associated therewith as hereinafter described. An annular insulating layer 92 is sandwiched between each of the conductive tab members 90 and the second electrode support 74 to electrically isolate the two elements from one another. The insulating ring 85 extends between the epoxy coating 60 of the drive tube 54 and the plurality of conductive tab members 90 to provide a compressive force therebetween.

Each conductive tab member 90 has an upper portion 90a which extends below each of the first through fourth slip-ring elements 80 through 83 respectively to enable physical and electrical contact therebetween. Each of the conductive tab members 90 further has a downwardly depending leg portion 90b which extends through an insulating collar 94 and is electrically connected (not illustrated) to the continuous field winding 68 of an associated one of the winding grooves 65 of the stator core member 64.

Figure 8:
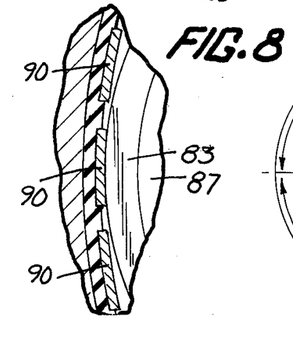
FIG. 8 is an enlarged view of that portion of the DC motor illustrated at "A" in FIG. 7, illustrating the contacting engagement of one of the slip-ring elements with the contact tabs at any instant of time.

The slip-ring elements 80 through 83 are sized to cooperatively mate with their associated rubbing block elements 87 such that the outer peripheral edge of each slip-ring element engages only one of the conductive tab members 90 at a time, see FIGS. 7 and 8. The inner diameter of each slip-ring element is sized such that when the slip-ring element is displaced by its associated rubbing block elements 87, it does not bind upon the outer coating 60 of the drive tube 54 at that position 180° removed from the "point of contact"therealong (FIG. 7).

The compressive pressure exerted upon the slidably engaging slip-ring elements 80 through 83 and the compressive seal of the insulator member 94 about the downwardly depending leg portions 90b of the conductive tab 90 and between the extended support arm portion 74a of the second electrode 74 and the first electrode 72, creates an airtight electrical contaact zonne 95 within the slip-ring assembly 70 which is particularly suitably for operation while submersed within a liquid medium. It will be understood that while a particular moisture-proof sealing arrangement has been illustrated, the invention contemplates other sealing configurations within its spirit and intent.

The electrical connection paths from the plurality of conductive tab members 90 to the winding grooves 65 within the stator core member 64 are also coated with epoxy for protection against moisture as are the windings themselves and the stator core member proper 64.

The centerless cylindrical drive tube 54 forms the output drive of the motor, which provides significant use advantages over prior art DC motors having an output drive shaft. A variety of centerless drive elements may be secured to the inner surface of the drive tube 54 for performing the desired work function. In the preferred embodiment, the DC motor is employed as a boat propulsion device, and a centerless helical drive auger 97 (FIG. 6) is rigidly secured along its outer circumference to the inner surface of the drive tube 54 for rotation therewith, forming a weedless high thrust propulsion means.

Operation of the Preferred Embodiment

The DC motor 20 of the preferred embodiment is a four-pole motor wherein the centerless cylindrical drive tube 54 is driven by an induction-repulsion effect caused by an interaction of magnetic field from the rotating permanent magnets 62, and as created by the slip-ring assembly 70. An understanding of the induction-repulsion effect can be best described with reference to the induction-repulsion schematic diagram of FIG. 10. Referring thereto, the schematic diagram represents the magnetic polarity status of the permanent magnets (represented by the innermost ring) and of the stator field windings (represented by the outer ring) at any instant of time. As previously described, the permanent magnets of the preferred embodiment have been selected such that each of their entire arcuately-shaped lateral surfaces represents a single North or South pole, as illustrated. The stator core member 64 is sequentially wound such that magnetic poles can be generated within the field pole pieces 66 of the stator core member 64, and such that those poles can be sequentially advanced around the inner circumference of the stator core member 64 as the windings within respective ones of the winding grooves 65 are sequentially energized by means of the slip-ring assembly 70 and conductive tab members 90.

The slip-rings 80 through 83 energize the field windings at selected positions around the circumference of the stator core member 64 as directed by the plurality of rubbing block elements 87. For example referring to FIG. 4, the second slip-ring element is illustrated as energizing the conductive tab member 90 by means of current flow from the first electrode 72, through the carbon ring 76 and the first and second slip-ring members 80 and 81 respectively. For a four-pole motor as illustrated, each of the slip-ring elements 80 through 83 simultaneously engages one of the conductive tab members 90 at locations circumferencially spaced 90° apart around the stator core member 64 such that successively encountered ones of the 90 degree spaced positions are alternately energized with positive and negative polarities, as determined by the relative positioning of the rubbng block elements 87 (see FIG. 9).

Figure 10:
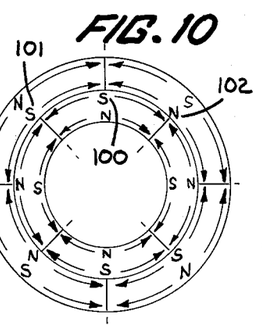
FIG. 10 is an induction-repulsionn schematic diagram for the four-pole motor of the preferred embodiment, illustrating the magnetic induction-repulsion forces present at any instant of time.

The initial positions of the rubbing block elements 87 relative the permanent magnets 62 upon the outer surface of the drive tube 54 is in the preferred embodiment, adjusted such that the magnetic polarities developed within the field pole pieces 66 if the stator core member 64 at any instant of time are displaced 45 degrees from those of the permanent magnets, as illustrated in FIG. 10. The induction-repulsion effect created at any instant of time, therefore, will be an attraction/ repulsion force effect upon the permanent magnets 62 tending to exert a rotational torque upon the cylindrical drive tube 54. For example referring to that "South"magnetic pole of the permanent magnet designated at 100 in FIG. 10, at any instant of time the South pole 100 will be repelled by the induced South pole of the stator core member 64 (designated at 101), while it will simultaneously be attracted by the magnetically induced North pole 102, causing a clockwise torque to be exerted upon the South pole 100 of the permanent magnet 62, and thus also upon the drive tube 54.

As the drive tube 54 rotates about the central axis 42, the rubbing block elements 87 likewise rotate therewith, continuously changing the energization of the field windings within the stator core members 64, but maintaining at any instant of time the induction-repulsion status illustrated in FIG. 10.

The effect is a simple, yet highly efficient induction motor ideally suited for submersible use within a liquid medium, as for example a boat propulsion device, but having extended capabilities elsewhere. The DC motor of this invention offers the significant advantage of eliminating the heretofore required center drive shaft and the conventional brush/slip-ring assemblies.

When employing the helical drive member 97 in its application as a boat propulsion device, the DC motor 20 provides significantly increased thrust due to the increased surface area continuously engaging the liquid media and minimizes loss of thrust due to cavitation. In the preferred embodiment a diameter of the helical drive member of only 6.5 inches develops 100 pounds of thrust, the equivalent of approximately a 10 horsepower outboard gasoline-type boat motor. The centerless helical design of the drive member 97 also allows for completely weedless operation of the device when used as a boat motor.

The DC motor of this invention also offers significant design flexibility. The number of poles can be increased merely by increasing the number of permanent magnets 62 and proportionately increasing the number of rubbing blocks 87 and slip-ring members within the slip-ring assembly 70. Horsepower ratings can be proportionately increased by increasing the physical diameter of the stator core member, by increasing its length, by increasing the number of windings, or by increasing the power applied to the windings-all without degrading the efffectiveness of the use of the motor 20. Also, as is well known with the use of DC motors in general, the direction of rotation of the drive tube 54 can be reversed simply by reversing the polarities applied to the first and second electrodes 72 and 74 respectively by means of a simple reversing switch, such as that schematically illustrated at 29 in FIG. 2. The speed of the motor is simply controlled by varying the voltage applied to the field windings through the first and second electrodes 72 and 74 respectively by means of the potentiometer 30 (FIGS. 2). In the preferred embodiment a 24 volt power supply 26 is used, however, it will be recognized that any appropriate voltage level could be employed within the spirit and intent of this invention.

While I have disclosed a specific embodiment of my invention, it is to be understoood that this is for the purposes of illustration only and that my invention is to be limited solely by the scope of the appended claims.

What is claimed is:

1. A gearless drive apparatus powered by a DC source, comprising:
   a. a generally cylindrical housing;
   b. a rigid centerless cylindrical drive tube, rotatable about a central axis longitudinally extending therethrough;
   c. bearing means in said housing operatively engaging said drive tube at opposite ends thereof for supportingly mounting said tube to said housing for rotation about said central axis, wherein the internal surface of said drive tube as mounted defines a cylindrical passageway through said housing;
   d. a plurality of permanent magnets circumferentially mounted to the outer surface of said drive tube for rotation therewith;
   e. electrical winding means fixedly mounted in said housing for creating when energized a plurality of induced magnetic fields spaced from and circumferencially disposed around said drive tube and in cooperative alignment with said permanent magnets; and
   f. energizing means operatively responsive to said rotational movement of said drive tube for selectively and sequentially energizing said winding means from said DC source to create said plurality of induced magnetic fields having predetermined polarities, which induced magnetic fields cooperate with the magnetic fields of said permanent magnets to exert a rotational torque about said central axis upon said drive tube.

2. A gearless drive apparatus according to claim 1, wherein said electrical winding means comprises:
 a. generally cylindrical stator coaxially aligned with said central axis having a plurality of alternating raised and lowered portions regularly disposed around its inner surface in cooperative alignment with said permanent magnets;
 b. a continuous conductor interwound among said lower portions of said stator in a predetermined wiring pattern such that when energized by current passing therethrough, said magnetic fields are created within said raised portions of said stator which define said plurality of induced magnetic fields; and
 c. a plurality of electrical contacts operatively connected at predetermined intervals along the length of said continuous winding for providing electrical energization access to said conductor at regular intervals therealong; and
wherein said energizing means includes switching means for operatively connecting positive and negative polarities of said DC source with selected ones of said plurality of electrical contacts in response to rotational movement of said drive tube, creating said induced magnetic fields of predetermined polarities within selected ones of said raised portions of said stator.

3. A gearless drive apparatus according to claim 2, wherein said plurality of electrical contacts are positioned at generally equally spaced intervals along said conductor and have projecting tab portions annularly disposed around and in spaced relationship with said drive tube, and wherein said energizing means comprises:
 a. a plurality of circular conductive slip-ring members having centers generally coaxial with said central axis and interposed between the outer surface of said drive tube and said plurality of electrical contact tabs;
 b. means for mounting said plurality of slip-ring members for slipping movement relative one another and relative said central axis such that each of said slip-ring members is movable to electrically contact each of said plurality of contact tabs;
 c. means for operatively connecting said positive and negative polarities of said DC source selectively with said plurality of slip-ring members; and
 d. a plurality of positioning elements mounted to the external surface of said drive tube for rotation therewith and positioned at predetermined circumferential positions relative one another, one each of said positioning elements operatively slidably engaging the inner circumference of a respective one of said slip-ring members for continuously slidably displacing that engaged slip-ring about said central axis, causing said slip-ring to sequentially engage respective ones of said plurality of contact tabs as said drive tube rotates.

4. A gearless drive apparatus according to claim 3, wherein consecutively aligned ones of said plurality of contact tabs are operatively connected to consecutive lengths of said conductor as wound about said stator, in a manner representing consecutively aligned ones of said plurality of magnetic poles, and wherein said plurality of positioning elements are mounted to slidably engage respective ones of said slip-ring members such that each of said engaged slip-ring members electrically contacts only one of said contact tabs at a time.

5. A gearless drive apparatus according to claim 4, wherein the number of said slip-ring elements equals the number of said rotating permanent magnets, causing the number of said induced magnetic fields produced at any instant of time to equal the number of said permanent magnet fields; and wherein said plurality of positioning elements are circumferentially oriented on said drive tube relative said permanent magnets to cause said induced magnetic fields to always appear arcuately displaced about said central axis from magnetic fields of said permanent magnets in an induction-repulsion manner providing uniform rotational torque to said drive tube.

6. A gearless drive apparatus according to claim 5, wherein said plurality of permanent magnets are arcuately shaped for conforming engagement to the external surface of said drive tube and wherein the entire external surface of each of said plurality of permanent magnets is of a singular magnetic polarity.

7. A gearless drive apparatus according to claim 1, including propulsion means secured to the inner surface of said drive tube for exerting a propulsion force in the general direction of said central axis upon said drive tube when said drive tube is rotating.

8. A gearless drive apparatus according to claim 7, wherein said drive apparatus is suitable for submersion within a liquid media; wherein said apparatus includes insulation means for insulating said electrical winding means from operative contact with said liquid media; and wherein said propulsion means is configured to exert a reciprocal propulsion force upons said liquid media within the internal cavity of said drive tube when said housing is submersed within said liquid media.

9. A gearless drive apparatus according to claim 8, wherein said propulsion means comprises a centerless helical member generally symmetrically configured about said central axis, having is outer peripheral edges secured to the inner surface of said drive tube in a manner providing an unobstruced passageway therethrough when said drive tube is rotating.

10. A centerless brushless DC motor for use with a DC source, comprising:
 a. a generally cylindrical housing; a
 b. a cylindrical centerless rigid rotor mounted to said housing for rotation about a longitudinally extending central axis in a manner such that the internal surface of said rotor defines a cylindrical passageway about said central axis through said housing, said rotor having a; plurality of permanent magnets mounted in balanced configuration in an annular ring around the outer circumference of said rotor for rotation therewith;
 c. stator means fixedly secured within said housing and operatively connected for energization by said DC source, for producing a plurality of induced magnetic poles when energized comprising:
  i. a generally cylindrical stator core having a slotted inner surface confrontingly operatively aligned in spaced relationship around said rotatable magnets; and ii. a continuous length of conductor wound in predetermined manner among the slots of said stator core such that said conductor when energized causes said induced magnetic poles having predetermined polarities to be generated around the inner surface of said stator core; and d. energization means operatively connecting said DC source with said wound conductor for directionally causing current flow through selected lengths of said conductor in response to rotation of said rotor, thus creating said plurality of induced magnetic poles which cooperatively react with the magnetic fields of said permanent magnets to exert rotational torque upon said rotor.

11. A centerless brushles DC motor, according to claim 10, wherein said plurality of permanent magnets are arcuately shaped for cooperative mounting to the outer surface of said rotor with the outer surfaces of said permanent magnets generally lying in a circle concentric with said central axis; wherein said slotted inner surface of said stator core comprises a plurality of regularly spaced alternating groove and raised pole piece portions circumferentially disposed around the inner surface of said stator core said continuous conductor being wound within said plurality of grooves and said plurality of raised pole piece portions being aligned in close cooperative confronting spaced realtionship with the outer surfaces of said permanent magnets; and wherein said energization means includes means for energizing said wound conductor in a manner creating said plurality of induced magnetic poles within the raised pole piece portions of said stator core at predetermined spaced intervals around the inner circumference thereof.

12. A centerless brushless DC motor according to claim 11, wherein said energization means including switching means responsive to rotation of said rotor for sequentially energizing successive selected lengths of said wound conductor in response to rotation of said rotor such that at any instant of time the induction-repulsion interaction status between the magnetic poles of the rotating permanent magnets and the plurality of induced magnetic poles within the raised pole pieces portions of said stator core, remains constant.

13. A centerless brushless DC motor according to claim 12, wherein said switching means comprises:
    a. a plurality of electrical contact elements operatively connected to selected lengths of said wound conductor for energization thereof; and
    b. slip-ring assembly means within said housing having a plurality of annular slip-ring members concentrically disposed about said central axis and about said rotor, operatively connected with said DC source for selectively sequentially energizing said plurality of electrical contact elements in response to rotation of said rotor.

14. A centerless brushless DC motor according to claim 13, wherein said plurality of electrical contact elements are fixedly mounted within said housing in a generally annular ring with successive ones of said contact elements being operatively connected to energize lengths of said conductor representing successively aligned ones of said raised pole piece portions of the stator; and wherein said slip-ring assembly means further includes a plurality of rubbing block elements mounted to the outer surface of said rotor and circumferentially disposed at predetermined regular intervals thereon, one each of said rubbing block elements being operatively aligned and cooperatively engaging one each of said slip-ring members for eccentrically displacing said engaged slip-ring members about said central axis as said rotor rotates, causing simultaneous electrical engagement of said slip-ring elements with said electrical contact elements, each of said slip-ring elements contacting only one of said electrical contact elements at a time.

15. A centerless brushless DC boat propulsion motor usable with a DC source, comprising:
    a. a generally cylindrical housing suitable for immersion within a liquid media;
    b. means for positioning said housing below the lower surface of a boat;
    c. a cylindrical centerless drive tube rotatable about a central axis and having a plurality of permanent magnets affixed to the outer surface thereof for rotation therewith;
    d. thrust bearing means operatively engaging said drive tube for rotatably mounting said drive tube within said housing, the inner surface of said drive tube as rotatably mounted defining a cylindrical passageway through said housing for passage of said liquid media therethrough;
    e. generally cylindrical stator means fixedly secured within said housing for providing when energized a plurality of induced magnetic poles aligned with and in close confronting relationship to said permanent magnets;
    f. slip-ring means for selectively energizing said stator means by said DC source to create said plurality of induced magnetic poles of predetermined polarity, said induced magnetic poles having predetermined polarities remaining fixed relative one another but rotatably advancing relative said stationary stator means in response to rotation of said drive tube, said induced and permanent magnetic fields reacting to create a rotational torque upon said drive tube; and
    g. propulsion means operatively connected to the inner surface of said drive tube and rotatable therewith for exerting a propulsion force upon said liquid media within said cylindrical passageway defined by said drive tube in a direction generally parallel to said central axis.

16. A centerless brushless DC boat propulsion motor according to claim 15, wherein said propulsion means comprises a centerless helical member generally symmetrically configured about said central axis, having its outer peripheral edges secured to the inner surface of said drive tube in a manner providing an unobstructed passageway for said liquid media therethrough when said drive tube is rotating.

17. A centerless brushless DC boat propulsion motor according to claim 15, wherein said stator means comprises a generally cylindrical stator having a plurality of alternating grooves and raised pole piece portions and a continuous conductor mounted within said grooves and interwound among said raised pole piece portions, said induced magnetic poles being presented at said raised pole piece portions; and wherein said slip-ring means comprises:
    a. plurality of electrical contact elements fixedly mounted within said housing around said drive tube and operatively connected to energize selected lengths of said conductor winding;

b. a plurality of slip-ring members concentrically disposed around said central axis and about said rotor and operatively connected with said DC source for selectively sequentially energizing said plurality of electrical contact elements, said slip-ring members being configured to contact only one of said electrical contact members at a time; and
c. a plurality of rubbing block elements mounted to the outer surface of said drive tube and circumferencially disposed at predetermined regular intervals thereon, one each of said rubbing block elements being operatively aligned with and cooperatively engaging one each of said slip-ring members for causing said slip-ring member to eccentrically move about said central axis in response to rotation of said drive tube for selectively energizing said plurality of electrical contact elements.

18. A centerless brushless DC boat propulsion motor according to claim 17, wherein said slip-ring means includes means for sealing the electrical contact area between said plurality of slip-ring members and said plurality of electrical contact elements from exposure to said liquid media.

* * * * *

UNITED STATES PATENT OFFICE
CERTIFICATE OF CORRECTION

PATENT NO. : 3,914,629
DATED : October 21, 1975
INVENTOR(S) : William P. Gardiner It is certified that error appears in the above-identified patent and that said Letters Patent are hereby corrected as shown below:

In column 1, line 21 "motor it" should be --motor. It--.

In column 4, line 43 "induction-repulsionn" should be --induction-repulsion--.

In column 4, line 56 "motor 20 illustrated" should be --motor 20 is illustrated--.

In column 6, line 6 "enntirely" should be --entirely--.

In column 6, lines 6-7 "adjustments" should be --adjustment--.

In column 8, line 35 "contaact" should be --contact--.

In column 8, line 35 "zonne" should be --zone--.

In column 8, line 65 "field" should be --fields--.

In column 9, line 42 bold print "45" should be plain number --45--.

In column 11, line 9 "a. generally" should be --a. a generally--.

In column 12, line 38 "upons" should be --upon--.

Signed and Sealed this third Day of February 1976

[SEAL]

Attest:

RUTH C. MASON
Attesting Officer

C. MARSHALL DANN
Commissioner of Patents and Trademarks